United States Patent
Ji et al.

(10) Patent No.: US 8,955,141 B2
(45) Date of Patent: Feb. 10, 2015

(54) METHOD OF DIGITAL RIGHTS MANAGEMENT ABOUT A COMPRESSED FILE

(75) Inventors: Joon Tae Ji, Uiwang-si (KR); Young Sik Ryu, Seoul (KR); Jong Il Lee, Goyang-si (KR)

(73) Assignee: Fasco.com Co., Ltd., Seoul (KR)

( * ) Notice: Subject to any disclaimer, the term of this patent is extended or adjusted under 35 U.S.C. 154(b) by 711 days.

(21) Appl. No.: 12/675,584

(22) PCT Filed: Jun. 30, 2008

(86) PCT No.: PCT/KR2008/003816
§ 371 (c)(1),
(2), (4) Date: Feb. 26, 2010

(87) PCT Pub. No.: WO2009/028792
PCT Pub. Date: Mar. 5, 2009

(65) Prior Publication Data
US 2010/0250926 A1    Sep. 30, 2010

(30) Foreign Application Priority Data
Aug. 28, 2007  (KR) .......................... 10-2007-0086361

(51) Int. Cl.
*G06F 21/10*    (2013.01)
(52) U.S. Cl.
CPC ...................................... *G06F 21/10* (2013.01)
USPC ............................................ 726/26; 726/27
(58) Field of Classification Search
None
See application file for complete search history.

(56) References Cited

U.S. PATENT DOCUMENTS

| | | | | |
|---|---|---|---|---|
| 7,062,658 | B1 * | 6/2006 | Cheriton et al. | 713/189 |
| 8,000,474 | B1 * | 8/2011 | Evans et al. | 380/205 |
| 2004/0139027 | A1 * | 7/2004 | Molaro | 705/59 |
| 2005/0005148 | A1 * | 1/2005 | Ishibashi et al. | 713/193 |
| 2006/0206899 | A1 * | 9/2006 | Suzuki et al. | 718/104 |
| 2006/0242069 | A1 * | 10/2006 | Peterka et al. | 705/50 |
| 2007/0150963 | A1 * | 6/2007 | Lee et al. | 726/27 |
| 2007/0294178 | A1 * | 12/2007 | Pinder et al. | 705/57 |
| 2008/0208755 | A1 * | 8/2008 | Malcolm | 705/59 |

FOREIGN PATENT DOCUMENTS

| | | |
|---|---|---|
| JP | 1997-218827 | 8/1997 |
| JP | 2002-91456 | 3/2002 |
| JP | 2004-264886 | 9/2004 |

(Continued)

*Primary Examiner* — Alexander Lagor
(74) *Attorney, Agent, or Firm* — Gottlieb, Rackman & Reisman, P.C.

(57) ABSTRACT

Provided is a method for digital rights management of a compressed file created by compressing one or more original files. The method include the steps of: generating right information on an encrypted compressed file during the encryption of the compressed file by a digital rights management server; checking the user right to the compressed file by controlling a predetermined compression application program by a controller module installed in a user terminal when the user terminal to which the encrypted compressed file is downloaded opens the compressed file using the compression application program; requesting the digital rights management server to provide a certificate to decrypt the encrypted file by the controller module of the user terminal; generating the certificate according to a certificate request from the user terminal and sending the generated certificate to the user terminal by the digital right management server; and decrypting the encrypted compressed file by the controller module of the user terminal based on the received certificate.

19 Claims, 3 Drawing Sheets

(56) References Cited

FOREIGN PATENT DOCUMENTS

| JP | 2005-269412 | 9/2005 |
| JP | 2007-172653 | 5/2007 |
| JP | 3955906 | 4/2008 |
| KR | P2002-0079112 | 10/2002 |
| WO | 2003/090138 | 10/2003 |
| WO | 2006/027749 | 3/2006 |

* cited by examiner

METHOD OF DIGITAL RIGHTS MANAGEMENT ABOUT A COMPRESSED FILE

TECHNICAL FIELD

The present invention relates to a method for digital rights management, and more particularly, to a method for digital rights management of a compressed file, which is capable of providing a user authentication system when the compressed file is downloaded and decompressed.

BACKGROUND ART

In recent years, with digitalization of various kinds of information such as documents, data and so on and development of Internet, E-mails, digital storage media and so on, users have been provided with chances to obtain their desired materials (hereinafter referred to as "digital data") with more promptitude and ease.

Digital data have a property that they can be easily copied or modified and distributed. This may cause a serious problem of leakage of confidential information owned by enterprises, facilities and so on by illegal copy and distribution of digital data, which may result in weakening of competitiveness of enterprises and nations.

In particular, with recent rapid progress of establishment of LANs (Local Area Networks) or KMSs (Knowledge Management Systems) in enterprises, information and materials of enterprises have been wandered from place to place, which results in easer access to digital data and hence higher possibility of leakage of confidential information of enterprises and facilities.

Accordingly, there has been a keen need for techniques for protection of digital data, and various techniques for protection against illegal distribution and use of digital data have been developed, including, for example, a firewall technique for management of system log-in and blockade of illegal access to systems, a digital rights management (DRM) technique for protection, security and management of digital documents, a technique for restricted use of E-mails, etc.

For the purpose of protection of such digital data, techniques have been developed and spread, which prevent unauthorized consumers or users from illegally copying and distributing decoded data in application programs for processing digital data, which are being distributed via Internet or CDs (Compact discs), and systems for processing digital documents carrying important data related to businesses of enterprises and public institutions. Such techniques check authority of users in digital data input/output programs and prohibit unauthorized users from illegally copying and distributing digital data.

In the meantime, there presently exist a number of compressed file formats (for example, "zip", "arj", "rar", etc.) and application programs (for example, "winzip", "alzip", etc.) for creating corresponding compressed files and decompressing the compressed files.

Although such compression application programs have their own cryptosystems to provide functions to allow only users, who know a password, to decompress compressed files, the users who know the password and acquire original source files by decompressing the compressed files may distribute the original source files, which are the object of compression, as they are, instead of the passworded compressed files, which brings shame to the purport of creation of the encrypted compressed files.

Accordingly, compressing resultant files (i.e., original source files) with password, which are made when the compressed files are decompressed, may make the best of the purport of applying password to the compressed files. However, it is a time-consuming and inconvenient task under actual use environments to compress the object files with the password using a cryptosystem of a compression application individually and re-compress the whole of the files. If the number of object files to be compressed is several hundreds or several thousands, in actuality, it is nearly impossible to compress all of the object files with passwords respectively.

Further, speaking critically, although such a task can be performed anyhow, a user who knows a password can decompress all of the object files to acquire original files in the last, and accordingly there still remains a possibility of distribution of the original files by the user who knows the password. In the end, a usual method to apply password to compressed files can not accomplish the object of distributing, opening and reading the compressed files to be protected without leaking original documents within the compressed files.

More specifically, the method of protecting compressed files and original files within the compressed files using only a cryptosystem provided by conventional compression application programs confronts the following problems.

Firstly, in a case where a compressed file should be distributed over a plurality of users, there is an inconvenience in that a password should be known to the plurality of users. In that case, the password must be known to them using pilferable direct contact means such as telephone or E-mail.

Secondly, users who know the password can use corresponding files unconditionally without any limitation to times and period of open and read of the files.

Thirdly, a creator who creates a compressed file can not grasp the history of open and read by users who know the password. Namely, the creator can not know whether or not users who wish to decompress the compressed file access the compressed file.

Fourthly, existing compression application programs do not provide security for files (to be compressed) within the compressed file. To provide the security for the files, there is a need to compress object files along with passwords when the object files are created. In addition, in this case, if passwords of the object files are differently applied, there is an inconvenience in that the passwords should be also individually distributed to users.

Fifthly, there exist methods of deciphering cryptosystem of existing compression application programs.

DISCLOSURE OF INVENTION

Technical Problem

It is therefore an object of the present invention to provide a method for digital rights management of a compressed file, which is capable of controlling open and read of the compressed file by controlling a compression application program when the compressed file is distributed and used.

It is another object of the present invention to provide a method for digital rights management of a compressed file, which is capable of controlling open and read of the compressed file by, in real time, encrypting and storing original files within the compressed file, which is encrypted and downloaded to a client terminal, when the compressed file is decompressed by a compression application program.

Technical Solution

To achieve the above objects, according to an aspect, there is provided a method for digital rights management of a compressed file created by compressing one or more original files, the method comprising the steps of: compressing unencrypted original files with a predetermined compression application program and uploading the compressed original files to an enterprise information system server; encrypting the compressed file by a digital rights management server according to a compressed file download request from a user terminal; generating right information on the encrypted compressed file during the encryption of the compressed file by the digital rights management server; sending the encrypted compressed file to the user terminal which requests the download of the compressed file in the enterprise information system server; checking the user right to the compressed file by controlling a predetermined compression application program by a controller module installed in the user terminal when the user terminal to which the encrypted compressed file is downloaded opens the compressed file using the compression application program; requesting the digital rights management server to provide a certificate to decrypt the encrypted file by the controller module of the user terminal; generating the certificate according to a certificate request from the user terminal and sending the generated certificate to the user terminal by the digital right management server; and decrypting the encrypted compressed file by the controller module of the user terminal based on the received certificate.

Preferably, the right information on the encrypted compressed file generated by the digital rights management server is one or more selected from a group consisting of an accessible user list, use term, frequency of use, and annulment.

Preferably, the method further comprises the step of: decompressing the compressed file by the compression application program.

Preferably, the step of decompressing the compressed file comprises controlling the compression application program by the installed controller module such that a call of a system API module recorded in an execution code zone of an execution module of the compression application program is hooked to an execution code zone of the controller module.

Preferably, the call function of the system API module is one or more selected from a group consisting of file creation (CreateFile), data read (ReadFile), data write (WriteFile) and file preparation completion (CloseHandle).

Preferably, the step of hooking the call of a system API module recorded in an execution code zone of an execution module of the compression application program to an execution code zone of the controller module comprises, by the controller module, altering a call parameter address of the system API module recorded in the execution code zone of the execution module of the compression application program to the execution code zone of the controller module.

Preferably, when the compressed file is decompressed, one or more original files decompressed from the compressed file are automatically encrypted in real time by the controller module.

Preferably, the encryption of the original files includes: decrypting data by an amount requested by the compression application program in real time when the encrypted compressed file is decrypted; encrypting the decrypted data; and storing the encrypted data in a file system in the unit of original file.

Preferably, the right to access the original file generated by encrypting the decrypted data is applied in the same way as the right to access the encrypted compressed file.

According to another aspect, there is provided a method for digital rights management of a compressed file created by compressing one or more original files, the method comprising the steps of: installing a controller module to control a predetermined compression application program in a user terminal; automatically creating an encrypted file by controlling the compression application program by the installed controller module when the original files are compressed by the compression application program in the user terminal; uploading the created encrypted file to an enterprise information system server; generating right information on the encrypted compressed file during the encryption of the compressed file by a digital rights management server; sending the encrypted compressed file to the user terminal which requests the download of the compressed file in the enterprise information system server; checking the user right to the compressed file by controlling a predetermined compression application program by the controller module installed in the user terminal when the user terminal to which the encrypted compressed file is downloaded opens the compressed file using the compression application program; requesting the digital rights management server to provide a certificate to decrypt the encrypted file by the controller module of the user terminal; generating the certificate according to a certificate request from the user terminal and sending the generated certificate to the user terminal by the digital right management server; and decrypting the encrypted compressed file by the controller module of the user terminal based on the received certificate.

Preferably, the right information on the encrypted compressed file is one or more selected from a group consisting of an accessible user list, use term, frequency of use, and annulment.

Preferably, the method further comprises the step of: decompressing the compressed file by the compression application program.

Preferably, the step of decompressing the compressed file comprises controlling the compression application program by the installed controller module such that a call of a system API module recorded in an execution code zone of an execution module of the compression application program is hooked to an execution code zone of the controller module.

Preferably, the call function of the system API module is one or more selected from a group consisting of file creation (CreateFile), data read (ReadFile), data write (WriteFile) and file preparation completion (CloseHandle).

Preferably, the step of hooking the call of a system API module recorded in an execution code zone of an execution module of the compression application program to an execution code zone of the controller module comprises, by the controller module, altering a call parameter address of the system API module recorded in the execution code zone of the execution module of the compression application program to the execution code zone of the controller module.

Preferably, when the compressed file is decompressed, one or more original files decompressed from the compressed file are automatically encrypted in real time by the controller module.

Preferably, the encryption of the original files includes: decrypting data by an amount requested by the compression application program in real time when the encrypted compressed file is decrypted; encrypting the decrypted data; and storing the encrypted data in a file system in the unit of original file.

Preferably, the right to access the original file generated by encrypting the decrypted data is applied in the same way as the right to access the encrypted compressed file.

According to still another aspect, there is provided a method for digital rights management of a compressed file created by compressing one or more original files, the method comprising the steps of: checking the user right to the compressed file by controlling a predetermined compression application program by a controller module installed in a user terminal when the user terminal to which an encrypted compressed file is downloaded opens the compressed file using the compression application program; requesting a digital rights management server to provide a certificate to decrypt the encrypted file by the controller module of the user terminal; generating the certificate according to a certificate request from the user terminal and sending the generated certificate to the user terminal by the digital right management server; and decrypting the encrypted compressed file by the controller module of the user terminal based on the received certificate.

Preferably, the method further comprises the step of: before checking the user right, generating right information on the encrypted compressed file during the encryption of the compressed file by the digital rights management server.

Preferably, the right information on the encrypted compressed file generated by the digital rights management server is one or more selected from a group consisting of an accessible user list, use term, frequency of use, and annulment.

Preferably, the method further comprises the step of: decompressing the compressed file by the compression application program.

Preferably, the step of decompressing the compressed file comprises controlling the compression application program by the installed controller module such that a call of a system API module recorded in an execution code zone of an execution module of the compression application program is hooked to an execution code zone of the controller module.

Preferably, the call function of the system API module is one or more selected from a group consisting of file creation (CreateFile), data read (ReadFile), data write (WriteFile) and file preparation completion (CloseHandle).

Preferably, the step of hooking the call of a system API module recorded in an execution code zone of an execution module of the compression application program to an execution code zone of the controller module comprises, by the controller module, altering a call parameter address of the system API module recorded in the execution code zone of the execution module of the compression application program to the execution code zone of the controller module.

Preferably, when the compressed file is decompressed, one or more original files decompressed from the compressed file are automatically encrypted in real time in the controller module.

Preferably, the encryption of the original files includes: decrypting data by an amount requested by the compression application program in real time when the encrypted compressed file is decrypted; encrypting the decrypted data; and storing the encrypted data in a file system in the unit of original file.

Preferably, the right to access the original file generated by encrypting the decrypted data is applied in the same way as the right to access the encrypted compressed file.

ADVANTAGEOUS EFFECTS

According to the present invention, when the DRM system for the compressed file is used during the compression, distribution and decompression of the compressed file, the present invention has the following advantages over when a cryptosystem basically provided by compression application programs is used.

Firstly, there is no need to use the cryptosystem provided by the compression application programs for safe distribution and use of the compressed file. In addition, it is possible to control term of open and read of the compressed file as well as whether or not the compressed file is opened and read. In addition, the control of the right to open and read the compressed file is equally applied to both of the compressed file and the original files compressed within the compressed file. Accordingly, even when the compressed file and the whole of files decompressed from the compressed file are freely distributed, the security of DRM is maintained.

Secondly, it is possible to continuously grasp the history of open and read of the compressed file until the compressed file is disused.

Thirdly, the compressed file can be disused. If the compressed file is marked to be disused in the DRM server application program, when it is requested to determine whether or not a user has the right to the compressed file, it is unconditionally decided that the user has no right to the compressed file. Accordingly, a user who acquires a disused compressed file can not decompress the compressed file any longer even if he/she has any right to the compressed file.

BEST MODE FOR CARRYING OUT THE INVENTION

Figure 1:
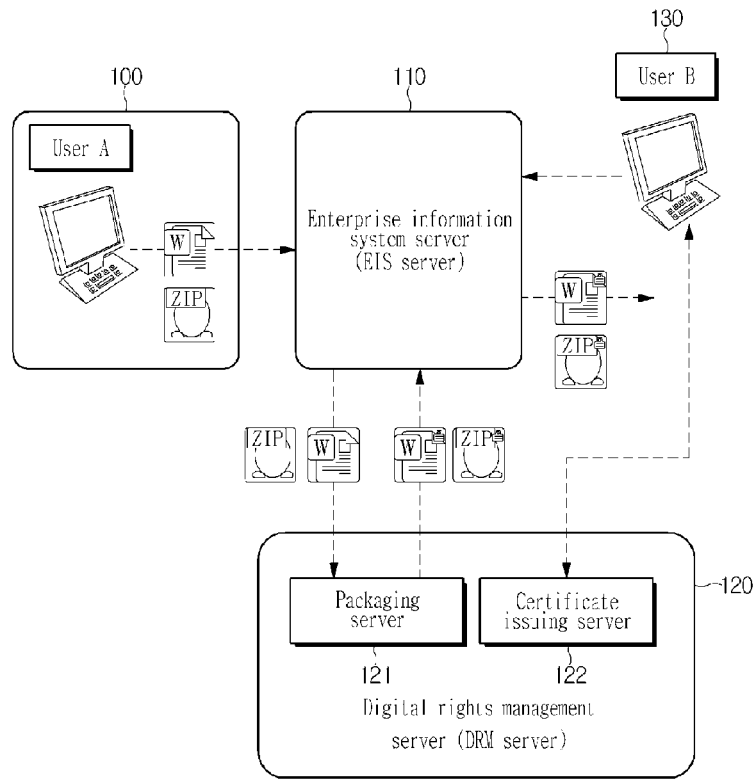
FIG. 1 is a view illustrating a digital rights management system for a compressed file in accordance with an embodiment of the present invention.

The present invention addresses controlling open and read of an encrypted compressed file by controlling a compression application program for decompressing the compressed file when the compressed file is distributed and used. This allows for provision of comprehensive DRM as well as decoding of the compressed file by a controller module to control the compression application program.

In addition, when the compressed file, which is encrypted according to an embodiment of the present invention and downloaded to a client terminal, is decompressed by means of the compression application program, it is possible to provide DRM for the original files as well as the compressed file by, in real time, encrypting and storing the original files within the compressed file by means of the controller module.

In the meantime, a DRM system according to an embodiment of the present invention provides a user authentication system separately from a cryptosystem provided by an existing compression application program. The user authentication system may include a client application program (controller module) to be executed in a user's computer and a server application program (DRM server) that stores authentication information.

In other words, the DRM client application program according to the embodiment of the present invention provides a function of encrypting a compressed file, and a producer who makes a compressed file encrypts the compressed file to be distributed using the function.

In this case, the compressed file can be encrypted in two methods. First, since the DRM client application program according to the embodiment of the present invention controls the compression application program (e.g., "winzip", "alzip", etc.) in real time, it can intervene in a procedure of production of the compressed file by the compression application program to produce an encrypted file automatically. This method is referred to as "real time production method." Another method is to progress encryption for a compressed file which has been previously produced, which is referred to as "post production method."

The post production method provides a separate user interface (UI) screen through which a user can designate and encrypt a compressed file.

On the other hand, original files to be compressed are not to be separately encrypted at the point of time of encrypting the compressed file. Accordingly, the DRM system according to the embodiment of the present invention encrypts the original files in real time when the encrypted compressed file is actually distributed and decompressed in the user's computer. Thus, the original files are also automatically encrypted under control of the DRM system.

In the above two compressed file encryptions, an accessible user list, use term, etc. are designated. In the real time production method, encryption can be automatically progressed based on preset information. In the post production method, additional information can be designated in the UI screen.

The above designated information is sent to the DRM server application program immediately after completion of compressed file encryption. The DRM server application program uses the information stored therein to authenticate users who attempt to pass the authentication system in order to access the compressed file.

A compressed file producer who encrypted the compressed file through the above procedure can distribute the encrypted compressed file via on/off line without any limitation. Since the information such as the user list, use term, frequency of use, etc. for access to the encrypted compressed file has been already sent to the DRM server application program, all subsequent authentication procedures may be performed by the method provided by the DRM system according to the embodiment of the present invention.

On the other hand, a user who tries to open and read the encrypted compressed file has to have the right to use the DRM system of the present invention in order to pass basic user authentication of the DRM system, and he/she can actually open and read the encrypted compressed file only when he/she is included in the file-accessible user list. Thus, users who are not included in the user list can not use the encrypted compressed file although they acquire the file. Accordingly, a person who produced the encrypted compressed file can manage the right to use the file through the DRM system even though he/she distributes the file without any limitation.

In other words, a user who tries to open and read the encrypted compressed file has to pass the authentication system provided by the DRM system of the present invention. For this procedure, it is preferable to install the DRM client application program for the compressed file provided by the present invention as well as the compression application program in the user's computer.

The DRM client application program (controller module) of the present invention uses a scheme to control the compressed application program (e.g., "winzip", "alzip", etc.) in real time, and accordingly, a user only has to issue an order to open and read the compressed file through the compression application program as usual without having to go through a separate procedure for decompression of the encrypted compressed file.

In this case, when the compression application program is to open the encrypted compressed file according to an instruction from the user, the installed DRM client application program recognizes this instruction and enters a user authentication procedure to verify whether or not the user is authenticated after interrupting a basic file input/output operation for a while.

Such a user authentication procedure starts by receiving a user ID and a password from a user in order to determine whether or not the user has the right to access the DRM system of the present invention. The password is registered for a user of the DRM system of the present invention, which is separated from a cipher used for the compression application program to create the compressed file.

In the meantime, the DRM client application program sends the received user ID and password to the server application program to check whether or not the user has the right to access the DRM system, and if the user is authenticated, receives a key value used to decrypt the encrypted compressed file from the server application program. Then, the DRM client application program uses the key value to decode data amounting to the amount requested by the compression application program and delivers the decoded data to the compression application program.

With this principle, the compression application program is in a position as if it reads a usual compressed file which is not encrypted. In this case, the compression application program stores compressed original files, which were used to create the compressed file, in a file system. Since the original files are more or less likely to be illegally used if they are stored as they are, the DRM client application program of the present invention intervenes in the above procedure in order to encrypt and store the stored original files in real time.

In the meantime, the right to access the encrypted original files is applied in the same way as the information used to encrypt the compressed file. For this reason, the encrypted original files may be also distributed without any limitation via on/off lines like the encrypted compressed file.

Hereinafter, preferred embodiments of the present invention will be described in detail with reference to the accompanying drawings. In the following detailed description of the present invention, concrete description on related functions or constructions will be omitted if it is deemed that the functions and/or constructions may unnecessarily obscure the gist of the present invention.

Figure 2:
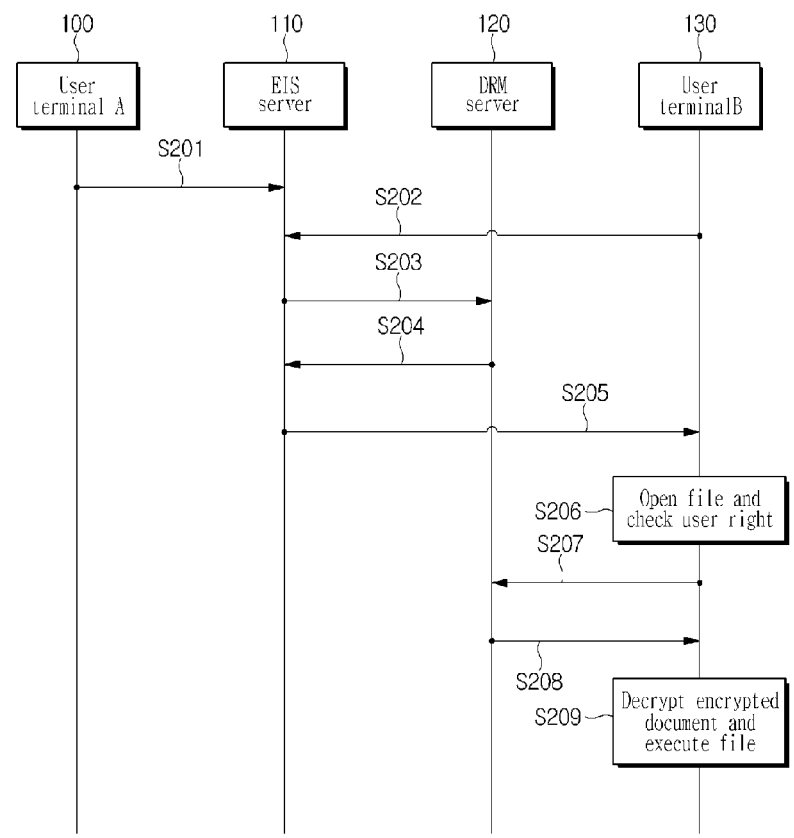
FIG. 2 is a signal flow diagram illustrating a procedure of digital rights management for a compressed file in accordance with an embodiment of the present invention.

FIG. 1 is a view illustrating a digital rights management system for a compressed file in accordance with an embodiment of the present invention, and FIG. 2 is a signal flow diagram illustrating a procedure of digital rights management for a compressed file in accordance with an embodiment of the present invention. Referring to FIGS. 1 and 2, non-encrypted plain document files are first compressed by a predetermined compression program (e.g., "alzip", "winzip", ect.) in a user terminal A 100 and then are uploaded to an Enterprise Information System (EIS) server 110 (e.g., EDMS, KMS, etc.) of an enterprise (S201).

In the meantime, a user terminal B 130 accesses the EIS server 110 and requests the EIS server 110 to download the compressed files uploaded by the user terminal A 100 (S202). At this time, the DRM system for the compressed file operates to manage the right to use the compressed file.

Specifically, the EIS server 110 sends the requested plain compressed file to a packaging server 121 of the digital rights management (DRM) server ("DRM server") to encrypt and manage the compressed file (S203). The packaging server 121 calls a packaging API to produce an encrypted file from the received plain compressed file. Then, the packaging server 121 sends the produced encrypted compressed document file to the EIS server 110 (S204).

At this time, as described above, an accessible user list, use term, etc. are designated so that the compressed file encrypted during the encryption of the compressed file can be managed under control of the DRM system.

In the meantime, the EIS server 110 sends the encrypted compressed file to the user terminal B 130 requesting the EIS server 110 to download the file (S205), and the user terminal B 130 which received the downloaded encrypted compressed file opens the compressed file using a predetermined compression application program.

When the compressed file is opened, a DRM client (controller module) installed in the user terminal B 130 controls the compression application program to check user authentication, that is, whether or not the user has the right to open and read or decode the compressed file (S206). Such user authentication checking may be implemented to be automatically processed by an SSO (single Sign On) method or the like, or may be implemented to input an authenticated ID and password.

At this time, the DRM client program requests a certificate issuing server 122 of the DRM server 120 to issue a certificate to be used to decrypt the encrypted compressed file (S207).

The certificate issuing server 122 of the DRM server 120 checks information on the right to the user terminal B 130 (user list, frequency of use, user term, etc.), and if it is checked that the user terminal B 130 has the right, generates the certificate and sends it to the user terminal B 130 (S208).

Finally, the DRM client of the user terminal B 130 decrypts the encrypted compressed file based on the certificate received from the DRM server 120, and decompress and executes the decrypted compressed file (S209).

On the other hand, in a server DRM system interlocking with the above-mentioned document management system, compressed original data files within the compressed file (e.g., "zip" files) may be decompressed and leaked to the outside as in distribution of usual documents (e.g., Word documents).

Thus, in accordance with the present invention, when the compression application program decompresses the compressed file, the DRM client encrypts and stores individual decompressed files in real time.

Figure 3:
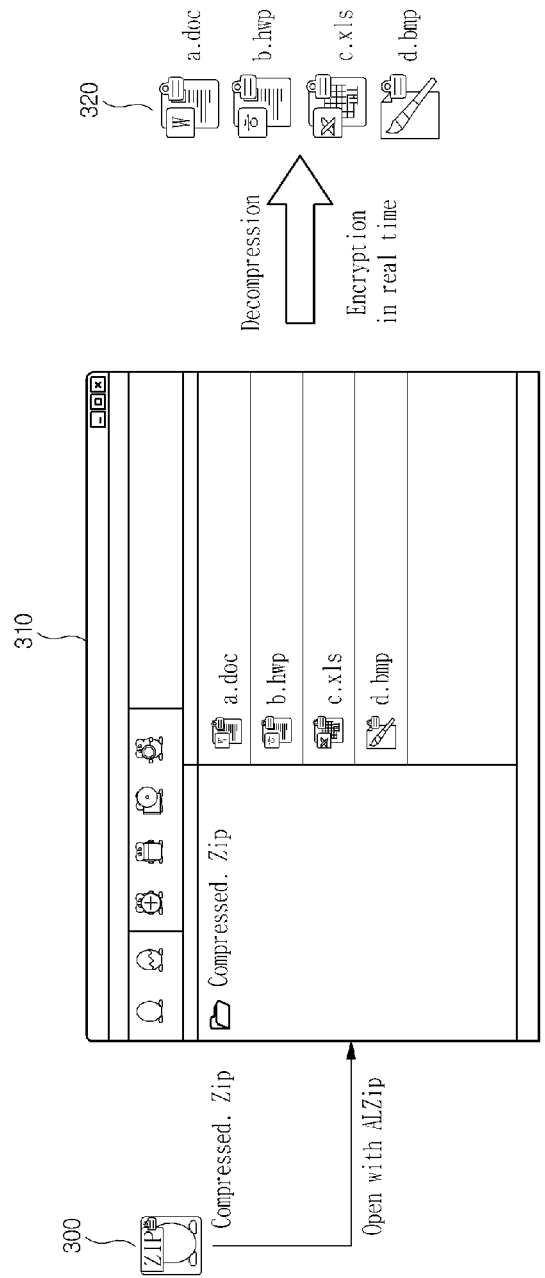
FIG. 3 is a view illustrating a method of digital rights management for decompressed original files in accordance with an embodiment of the present invention.

FIG. 3 is a view illustrating a method of digital rights management for decompressed original files in accordance with an embodiment of the present invention. Referring to FIG. 3, when an encrypted compressed file 300 downloaded to a client terminal is decompressed using a compression application program 310 such as "alzip" or "winzip", and compressed original files 320 of various formats (e.g., "a.doc", "b.hwp", "c.xls", d.bmp", etc.) within the compressed file are decompressed and stored in a local disc, the original files 320 are encrypted in real time (based on inherited formats and right applied to the compressed file), thus obtaining the same security effect as when usual documents are applied to the DRM system.

Figure 4:
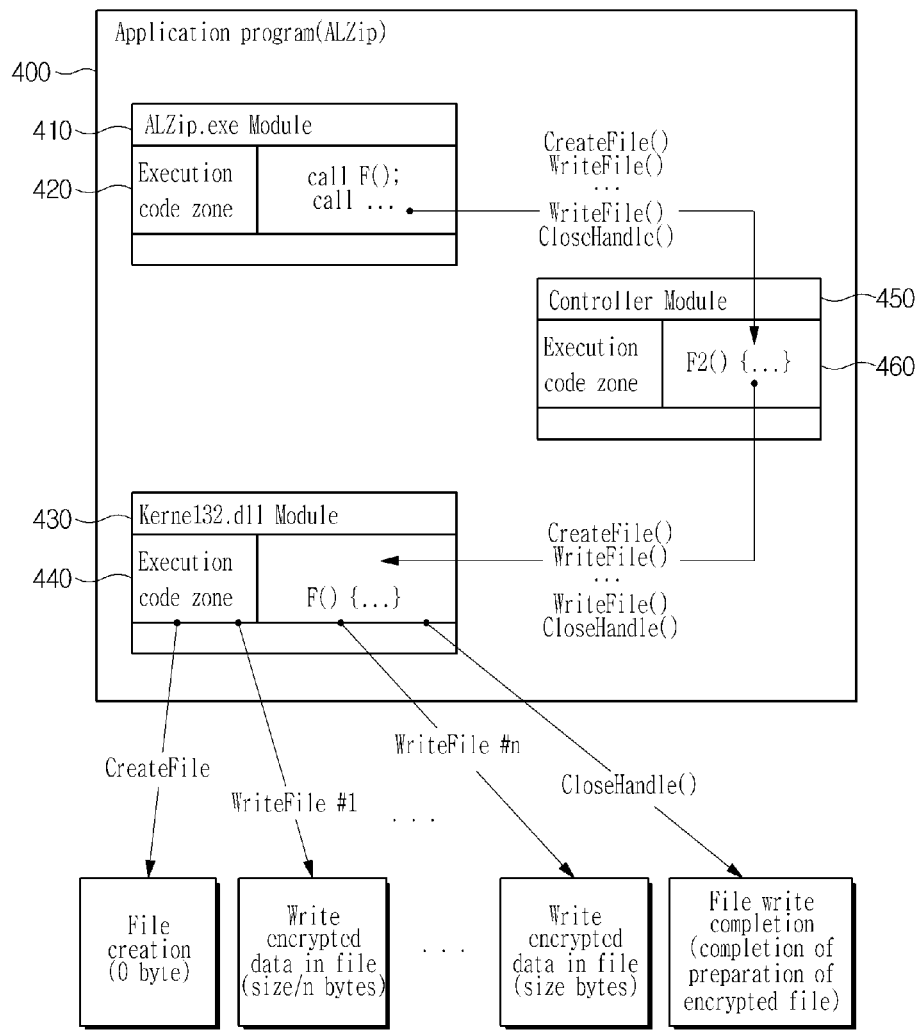
FIG. 4 is a view illustrating a method of controlling a compression application program for encryption of decompressed original files in accordance with an embodiment of the present invention.

FIG. 4 is a view illustrating a method of controlling a compression application program for encryption of decompressed original files in accordance with an embodiment of the present invention. Referring to FIG. 4, when a compression application program 400 such as "alzip" decompresses a compressed file (e.g., a "zip" file) and stores original data files within the compressed file in a local disc, the program 400 calls the following system APIs successively for each of the individual original data files.

Specifically, in a conventional compression application program, an execution code zone 420 of an execution module (e.g., an ALZip.exe module 410) of the application program directly calls functions of a system API module (e.g., a Kernel32.dll module 430) for generation of files, preparation of data and execution of file preparation completion instructions. On the contrary, in the embodiment of the present invention, an installed controller module 450 controls the compression application program such that the functions of the system API module 430 are hooked and called to an execution code zone 460 of the controller module, not directly called by the execution code zone 420 of the execution module 410 of the compression application program.

To implement this embodiment, the controller module 450 alters parameters of the call functions such that the call functions (e.g., file creation (CreateFile), data read (ReadFile), data write (WriteFile), file preparation completion (CloseHandle), etc.) within the execution code zone 420 of the execution module 410 of the application program point to function addresses within the execution code zone 460 of the controller module 450.

Accordingly, whenever a system API module call of the execution code zone 420 of the execution module 410 is made, a corresponding call instruction is executed in the execution code zone 460 of the controller module 450.

Thus, the controller module 450 plays a role of a DRM client to encrypt original files to create individual files at the same time of decompressing a compressed file.

For example, although a file creation (CreateFile( )) API and a file preparation completion (CloseHandle( )) API in the system API 430 are firstly and finally called to create one individual file, a data write (WriteFile( )) API is generally divided into any small pages and is called several times without being written one time by a size of an actual file and at this time, the DRM controller module 450 encrypts pages corresponding to a size, which is actually written, in real time and then writes the encrypted pages in an object file.

In other words, original files are not encrypted after they are all written on a local disc, but the DRM controller module 450 intervenes in creation/write/completion of the original files in real time for encryption of the original files, with no original data file existing on the local disc. Accordingly, there is no risk of leakage of the original files.

While the present invention has been particularly shown and described with reference to exemplary embodiments thereof, it will be understood by those skilled in the art that various changes in form and details may be made therein without departing from the spirit and scope of the present invention as defined by the appended claims and equivalents thereof.

The invention claimed is:

1. A method for digital rights management of a compressed file created by compressing one or more original files, the method comprising the steps of:
   checking a user right to an encrypted compressed file when the encrypted compressed file is downloaded from a server via a network to a user terminal is opened by using a compression application program;
   requesting a digital rights management server to provide a certificate to decrypt the encrypted compressed file;
   receiving the certificate generated from the digital rights management server;
   decrypting the encrypted compressed file based on the received certificate; and decompressing the compressed file by the compression application program, said decompressing including controlling the compression application program by a client application executable on the user terminal such that a call of a system application programming interface module recorded in an execution code zone of an execution module of the compression application program is hooked to an execution code zone of the client application, wherein hooking the call includes altering a call parameter address of the system application programming interface module recorded in the execution code zone of the execution module of the compression application program to the execution code zone of the client application; and when the compressed file is decompressed, automatically encrypting the one or more original files decompressed from the compressed file in real time for storing the encrypted original files in a local disc of the user terminal;

wherein a data write application programming interface is called a plurality of times during the automatic encryption, to automatically encrypt one or more original files and write the automatically encrypted files on the local disc in real time.

2. The method according to claim 1, wherein said checking the user right is performed by controlling the compression application program by the client application.

3. The method according to claim 2, further comprising the steps of:

encrypting the compressed file by the digital rights management server; and generating right information on the encrypted compressed file during the encryption of the compressed file by the digital rights management server.

4. The method according to claim 3, further comprising the step of compressing an unencrypted original file and uploading the compressed file to an enterprise information system server via the network;

wherein the compressed file is provided to the digital rights management server for performing the encryption.

5. The method according to claim 3, further comprising the step of:

uploading the encrypted compressed file to an enterprise information system server via the network; and uploading via the network the encrypted compressed file in the enterprise information system server to the user terminal which requests the download of the compressed file.

6. The method according to claim 3, wherein the right information on the encrypted compressed file generated by the digital rights management server is selected from the group consisting of: an accessible user list, use term, frequency of use, and annulment.

7. The method according to claim 1, including a call function of the system application programming interface module selected from a group consisting of: file creation, data read, data write and file preparation completion.

8. The method according to claim 1, wherein the right to access the original file generated by encrypting the decrypted data is applied in the same way as the right to access the encrypted compressed file.

9. A method for digital rights management of a compressed file created by compressing one or more original files, the method comprising the steps of:

installing a client application executable on a user terminal to control a predetermined compression application program in the user terminal;

encrypting the compressed file;

generating right information on the encrypted compressed file by a digital rights management server;

downloading the encrypted compressed file from a server via a network to the user terminal which requests the download of the compressed file;

checking the user's right to the encrypted compressed file by controlling the predetermined compression application program by the client application installed in the user terminal when the user terminal, to which the encrypted compressed file is downloaded, opens the encrypted compressed file using the compression application program;

requesting the digital rights management server to provide a certificate to decrypt the encrypted compressed file by the client application of the user terminal;

generating the certificate according to a certificate request from the user terminal and sending the generated certificate to the user terminal by the digital rights management server;

decrypting the encrypted compressed file by the controller module of the user terminal, based on the received certificate; and decompressing the compressed file by the compression application program, said decompressing the compressed file including controlling the compression application program by the installed client application such that a call of the system application programming interface module recorded in an execution code zone of an execution module of the compression application program is hooked to an execution code zone of the client application;

hooking the call of the system application programming interface module recorded in the execution code zone of the execution module of the compression application program to the execution code zone of the client application, altering a call parameter address of the system application programming interface module recorded in the execution code zone of the execution module of the compression application program to the execution code zone of the client application; and when the compressed file is decompressed, automatically encrypting the one or more original files decompressed from the compressed file in real time for storing the encrypted original files in a local disc of the user terminal;

wherein a data write application programming interface is called a plurality of times during the automatic encryption, and the one or more original files are automatically encrypted and written in the local disc in real time.

10. The method according to claim 9, wherein encrypting the compressed file comprises the step of:

automatically creating the encrypted compressed file by controlling the compression application program by the client application when the original file is compressed by the compression application program in the user terminal; and uploading the created encrypted compressed file to an enterprise information system (EIS) server via a network, wherein the uploaded encrypted compressed file in the EIS server is provided to the user terminal.

11. The method according to claim 10, wherein the right information on the encrypted compressed file is selected from the group consisting of: an accessible user list, use term, frequency of use, and annulment.

12. The method according to claim 9, wherein the call function of the system application programming interface module is selected from the group consisting of: file creation, data read, data write and file preparation completion.

13. The method according to claim 9, wherein the encryption of the original files includes: decrypting data as requested by the compression application program in real time when the encrypted compressed file is decrypted; encrypting the decrypted data; and storing the encrypted data in a file system in the unit of original file.

14. The method according to claim 13, wherein the right to access the original file generated by encrypting the decrypted data is applied in the same way as the right to access the encrypted compressed file.

15. A digital rights management system comprising:
- a user terminal which downloads an encrypted compressed file from a server via a network, the user terminal includes a compression application program controller performing the compression application program for decompressing the encrypted compressed file,
- wherein the compression application program controller includes a client application executable on the user terminal, the client application controls a user right to the encrypted compressed file to be checked when the encrypted compressed file provided to the user terminal is opened, a certificate for decrypting the encrypted compressed file to be requested to an external server, and the encrypted compressed file to be decrypted by using the certificate;
- wherein the compression application program controller further performs an operation of decompressing the decrypted compressed file, said decompressing the compressed file including controlling the compression application program by the client application such that a call of a system application programming interface module recorded in an execution code zone of an execution module of the compression application program is hooked to an execution code zone of the client application;
- wherein hooking the call of the system application programming interface module recorded in the execution code zone of the execution module of the compression application program to the execution code zone of the client application, altering a call parameter address of the system application programming interface module recorded in the execution code zone of the execution module of the compression application program to the execution code zone of the client application; and
- wherein the compression application program controller performs an operation of encrypting one or more original files generated by decompressing the compressed file in real time;
- wherein a data write application programming interface is called a plurality of times during the automatic encryption, and the one or more original files are automatically encrypted and written in the local disc in real time.

16. The digital rights management system according to claim 15, wherein the compression application program controller decompresses the compressed file sequentially by data of a predetermined amount, encrypts the decompressed data, and stores the encrypted data in the system in the unit of data of the predetermined amount.

17. The digital rights management system according to claim 15 further comprising a digital rights management server as the external server, the DRM server including:
- a packaging server receiving the compressed file and generating the encrypted compressed file by encrypting the compressed file; and
- a certificate issuing server checking whether the user terminal has a user right to the encrypted compressed file and providing the certificate to the user terminal based on the result of the checking.

18. The digital rights management system according to claim 17, wherein the packaging server generates right information on the encrypted compressed file during the encryption of the compressed file,
- wherein the right information is selected from the group consisting of: an accessible user list, use term, frequency of use, and annulment.

19. The digital rights management system according to claim 15 further comprising an enterprise information system server interconnecting with the user terminal and the external server,
- wherein the enterprise information system server receives the compressed file, providing the compressed file to the external server via the network for conducting an encryption of the compressed file and providing the encrypted compressed file to the user terminal according to the request of the user terminal.

\* \* \* \* \*